US009217203B2

(12) United States Patent
Gotheil-Yelle

(10) Patent No.: US 9,217,203 B2
(45) Date of Patent: *Dec. 22, 2015

(54) HYDROGEN GAS GENERATOR

(71) Applicant: Scott Gotheil-Yelle, Stratford, CT (US)

(72) Inventor: Scott Gotheil-Yelle, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,210

(22) Filed: Oct. 25, 2013

(65) Prior Publication Data

US 2014/0054181 A1    Feb. 27, 2014

Related U.S. Application Data

(63) Continuation of application No. 13/099,707, filed on May 3, 2011, now Pat. No. 8,591,707.

(51) Int. Cl.
C25B 11/02 (2006.01)
C25B 9/06 (2006.01)
C25B 9/00 (2006.01)

(52) U.S. Cl.
CPC ... *C25B 9/06* (2013.01); *C25B 9/00* (2013.01); *C25B 11/02* (2013.01); *Y02E 60/364* (2013.01); *Y02E 60/366* (2013.01)

(58) Field of Classification Search
None
See application file for complete search history.

(56) References Cited

U.S. PATENT DOCUMENTS

| 820,113 | A | 5/1906 | Hinkson |
|---|---|---|---|
| 3,282,823 | A | 11/1966 | Richards |
| 3,858,435 | A | 1/1975 | Stevens |
| 4,276,147 | A | 6/1981 | Epner et al. |
| 4,379,043 | A | 4/1983 | Chappelle |
| 5,071,532 | A | 12/1991 | Taillet et al. |
| 5,102,515 | A | 4/1992 | Ibbott |
| 5,395,492 | A | 3/1995 | Schoeberl |
| 5,587,057 | A | 12/1996 | Metzler et al. |
| 5,705,051 | A | 1/1998 | Coin et al. |
| 5,788,820 | A | 8/1998 | Liu |
| 7,021,249 | B1 | 4/2006 | Christison |
| 7,513,978 | B2 | 4/2009 | Petillo |
| 7,563,418 | B2 | 7/2009 | Sharpe |
| 7,837,842 | B1 | 11/2010 | Mayers, Sr. et al. |
| 8,591,707 | B2 * | 11/2013 | Gotheil-Yelle ............... 204/272 |
| 2003/0205482 | A1 | 11/2003 | Allen |
| 2005/0016840 | A1 * | 1/2005 | Petillo ............................ 204/248 |
| 2010/0170454 | A1 | 7/2010 | McBride et al. |
| 2010/0258450 | A1 | 10/2010 | Burtch |
| 2011/0147204 | A1 | 6/2011 | Leiato et al. |
| 2011/0259757 | A1 * | 10/2011 | Vancina ........................ 205/628 |

FOREIGN PATENT DOCUMENTS

DE    102009025887    1/2011
EP    2199431    6/2010

(Continued)

*Primary Examiner* — Harry D Wilkins, III
(74) *Attorney, Agent, or Firm* — DeLio, Peterson & Curcio LLC; Kelly M. Nowak

(57) ABSTRACT

A hydrogen generating device comprising an anode, a cathode, a housing having an internal cavity and a perforated wall within the cavity electrically connected to the anode or the cathode and separating an end portion of the cavity from a main portion of the cavity. The device includes water in the housing extending continuously from the main portion of the cavity through the perforated wall and into the end portion of the cavity. The housing includes two ends and a perforated wall within the cavity near each end separating end portions of the cavity from a main portion of the cavity, the anode or the cathode extending through one end of the housing through one perforated wall into the main portion of the cavity, through the other perforated wall into the other end portion of the cavity and through the other end of the housing.

20 Claims, 6 Drawing Sheets

(56) References Cited

FOREIGN PATENT DOCUMENTS

| | | |
|---|---|---|
| JP | 05-027062 | 2/1993 |
| JP | 06-247701 | 9/1994 |
| JP | 2008013821 | 1/2008 |
| JP | 2010053384 | 3/2010 |
| JP | 2010133026 | 6/2010 |
| KR | 20080025276 | 3/2008 |
| KR | 20110040149 | 4/2011 |
| WO | WO 2008/141369 A1 * 11/2008 | ................ C25B 1/04 |

* cited by examiner

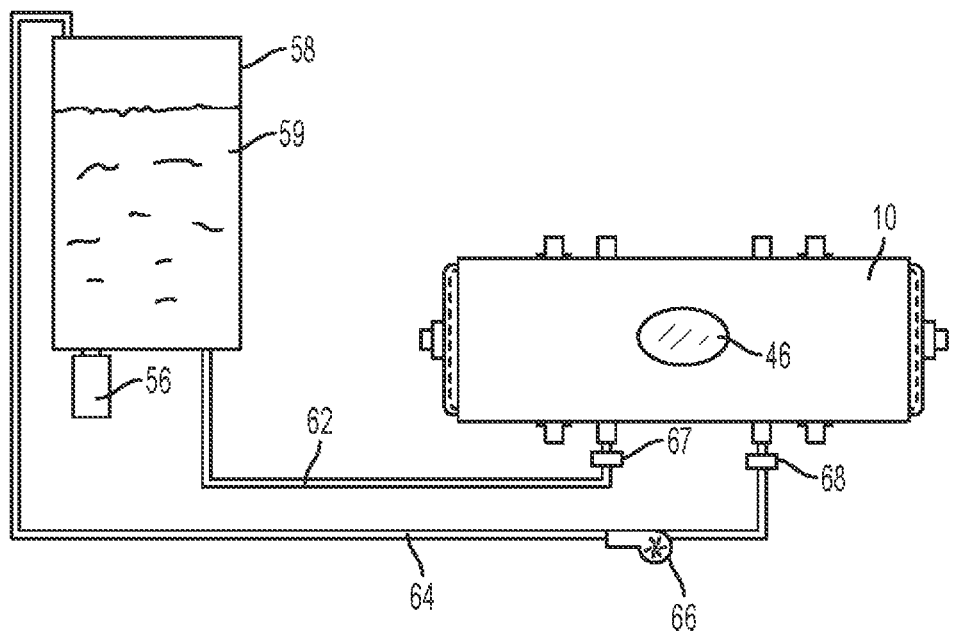
FIG. 11
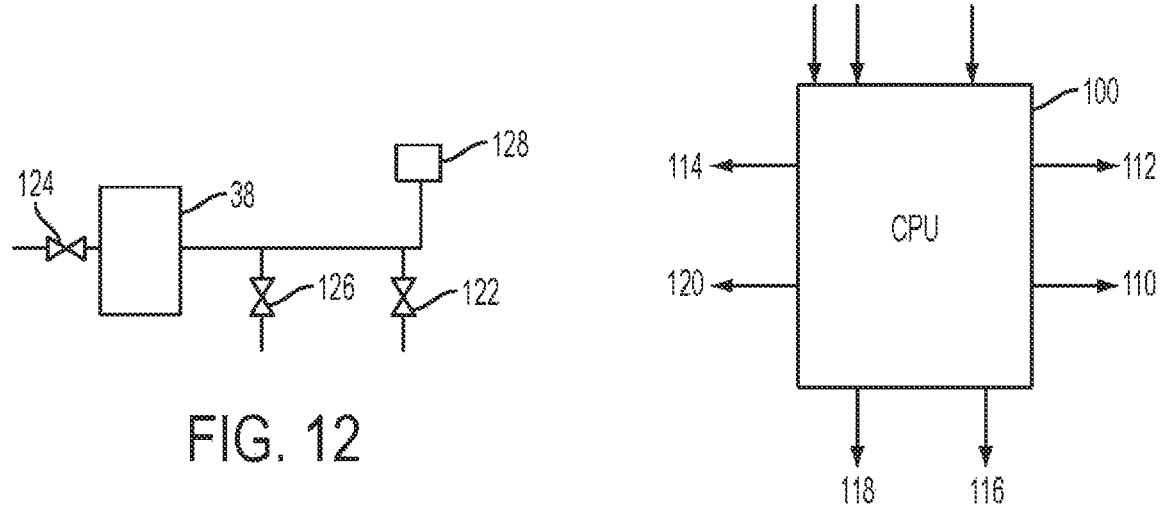
FIG. 12
FIG. 13

HYDROGEN GAS GENERATOR

This application is a continuation application of pending U.S. patent application Ser. No. 13/099,707 filed May 3, 2011, which is hereby incorporated by reference in its entirety.

BACKGROUND OF THE INVENTION

1. Field of the Invention

The present invention relates to hydrogen gas generators for the production of hydrogen gas.

2. Description of Related Art

Hydrogen generators produce a mixture of hydrogen ($H_2$) and oxygen ($O_2$) gases, typically in a 2:1 molar ratio, the same proportion as water.

Hydrogen gas generators include four main components; a cathode, an anode and a salt or brine solution contained within a cavity which includes the anode and cathode. The generator usually consists of stainless steel metal plates stacked with spacing between the plates to allow the brine solution to flow therebetween. An alternating cathode and anode plate configuration allows current to flow through the brine salt solution producing a chemical reaction when a voltage differential is placed between the anode and cathode plates.

The metal plate stack is the most common configuration for a hydrogen gas generator. One problem associated with the stacked plates is that the fluid between the plates is not easily exchanged with fresh fluid from other parts of the generator, decreasing the efficiency of the generator.

SUMMARY OF THE INVENTION

Bearing in mind the problems and deficiencies of the prior art, it is therefore an object of the present invention to provide a device for the production of hydrogen gas.

It is another object of the present invention to provide a cylindrical hydrogen gas generator which produces hydrogen gas more efficiently than the stacked plate generators.

Still other objects and advantages of the invention will in part be obvious and will in part be apparent from the specification.

The above and other objects, which will be apparent to those skilled in the art, are achieved in the present invention which is directed to a hydrogen generating device comprising an anode, a cathode, a housing having an internal cavity and a perforated wall within the cavity near an end thereof electrically connected to the anode or the cathode and separating an end portion of the cavity from a main portion of the cavity. The device includes water in the housing extending continuously from the main portion of the cavity through the perforated wall and into the end portion of the cavity.

The anode or the cathode which is electrically connected to the perforated wall may extend from the main portion of the cavity through the perforated wall into the end portion of the cavity and through the housing. The housing may have two ends and a perforated wall within the cavity near each end separating end portions of the cavity from a main portion of the cavity. The anode or the cathode extend through one end of the housing through one perforated wall into the main portion of the cavity, through the other perforated wall into the other end portion of the cavity and through the other end of the housing. The water in the housing extends continuously from the main portion of the cavity through each of the perforated walls and into the end portions of the cavity.

The perforated wall may be a metal plate having openings therein or may be an open cell metal foam. The hydrogen generating device may include a cylindrical metal sleeve slidingly disposed within the internal cavity, the metal sleeve having ends, and an insulating spacer ring disposed between the metal sleeve ends and the perforated wall.

The anode may be a hollow metal tube spirally wound in a cylindrical configuration. The anode may alternately be a hollow metal cylinder which includes a plurality of anode openings through the cylinder walls or the anode may be a cylindrical wire mesh.

The hydrogen generating device may include at least one electrically conductive terminal extending outward from the cavity through an opening in the housing wherein the at least one terminal is in electrical contact with the anode.

Another embodiment the present invention is directed to a hydrogen generating device comprising a housing having an internal cavity, an anode within the internal cavity and a cathode within the internal cavity. The device includes an open cell metal foam disposed within the internal cavity electrically connected to the anode or the cathode. The device includes water in the housing extending continuously through the metal foam. The open cell foam may be the anode having channels therein with the cathode extending through the channels in the foam anode. The anode channels may have a length and channel walls with a space between the cathode and channel walls extending the length of the channel walls, the space substantially filled with the water.

The open cell foam may alternately be the cathode having channels therein, with the anode extending through the channels in the foam cathode. The hydrogen generating device may include a cylindrical metal sleeve slidingly disposed within the internal cavity. The metal sleeve may have ends wherein an insulating spacer ring is disposed between the metal sleeve ends and the perforated wall.

The metal foam may include a coating of gold metal.

Another embodiment of the present invention is directed to a method for using a hydrogen generating device. The method comprises providing an anode, a cathode, a housing having an internal cavity and a perforated wall within the cavity near an end thereof separating an end portion of the cavity from a main portion of the cavity. The anode or the cathode extends from the main portion of the cavity through the perforated wall into the end portion of the cavity and through the housing and water in the housing extending continuously from the main portion of the cavity through the perforated wall and into the end portion of the cavity. The method includes applying a voltage differential between the anode and cathode sufficient to allow production of hydrogen gas.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 11 is a side elevational view of a hydrogen gas generator including a reservoir system according to the present invention.

FIG. 12 is a block diagram of a valve system for controlling gas output according to the present invention.

FIG. 13 is a block diagram of a controller for the hydrogen gas generator according to the present invention.

DESCRIPTION OF THE PREFERRED EMBODIMENT(S)

In describing the preferred embodiment of the present invention, reference will be made herein to FIGS. 1-13 of the drawings in which like numerals refer to like features of the invention.

Figure 1:
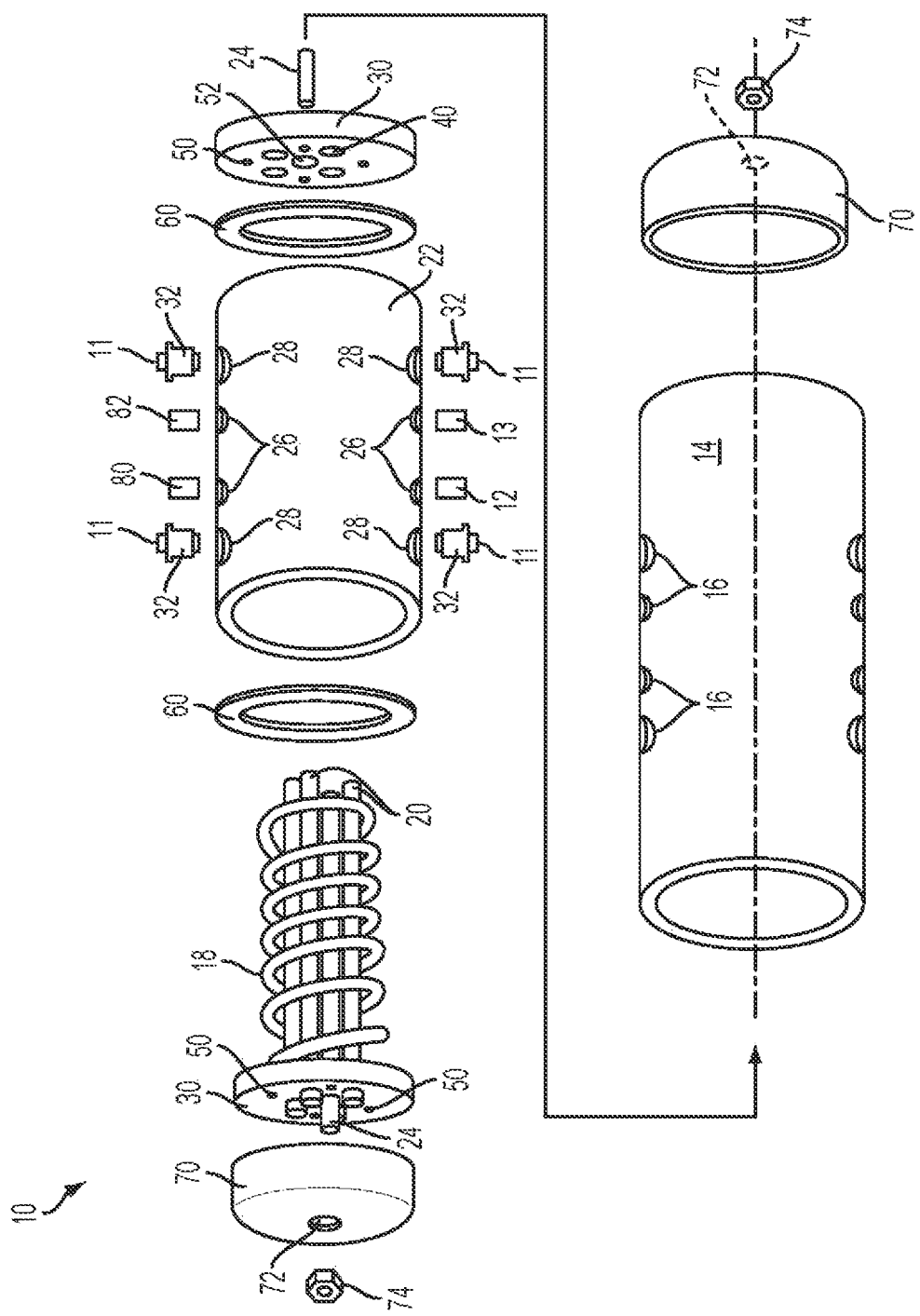
FIG. 1 is an exploded perspective view of the hydrogen gas generator according to the present invention.
Figure 2:
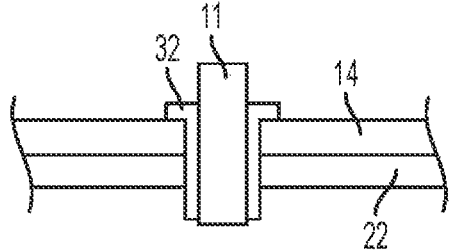
FIG. 2 is a cross sectional view of an anode terminal and terminal insulator according to the present invention.

A hydrogen gas generator 10 shown in FIG. 1 includes a cylindrical ceramic coated aluminum housing 14 having housing openings 16 and a cylindrical metal sleeve 22 slidingly disposed inside the housing 14, the metal sleeve 22 being shorter in length than the housing 14. The housing 14 has opposing ends and a cavity between the ends and a perforated wall 30 abuts the ends of metal sleeve 22 and is spaced from and near each of the housing ends. The metal sleeve 22 includes non-insulated sleeve openings 26 and insulated sleeve openings 28. The non-insulated openings 26 are for engaging an inlet port 12 and a drain port 13 for the brine solution, a hydrogen gas outlet port 80 and a purge valve port 82. The insulated sleeve openings 28 are for anode terminals 11 which extend from outside the housing 14 to the anode inside the cylindrical metal sleeve 22. Terminal insulators 32 are disposed between the anode terminal 11 and the insulated sleeve openings 28 as shown in the cross sectional view of FIG. 2. Ends of the anode terminals 11 protrude from the terminal insulators 32 so that electrical connection can be made to the anode 18 inside the cavity and to a power supply external to the cavity. The metal sleeve 22 openings align with the housing openings 16 so that the terminals 11 and each of the drain port 13, inlet port 12, hydrogen gas outlet port 80 and purge valve port 82 extend through the corresponding housing opening 16 and sleeve openings 26, 28, sealingly contacting the housing 14 and preventing liquid and gas within the cavity from leaking from the cavity through the housing openings 16. The hydrogen gas generator anode may be of any suitable type and configuration, but is shown in FIG. 1 as a cylindrical spiral anode 18. The anode is contacted by terminals 11, which support it within and spaced from sleeve 22 and the cathode structures within the device.

A plurality of cathode rods 20, here shown as a central rod surrounded by four spaced rods, extend from the perforated wall 30 at one end of the housing 14 to the opposing perforated wall 30 at the other end of the housing, with each cathode rod 20 making electrical contact with the walls. At each end of the housing 14, a cathode terminal 24 is disposed in a central opening 52 of the perforated wall 30 and extends through an end cap opening 72 in the end cap 70. The cathode terminal 24 may be threaded so that a terminal nut 74 secures the end cap 70 against the perforated wall 30. The cathode terminal 24 provides a common connection for the cathode rods 20 through contact with the perforated wall 30.

The hydrogen gas generator includes an insulating spacer 60 near each end of the housing 14 and which seats against the sleeve 22 ends so that perforated wall 30 may be sealed to the sleeve without making electrical contact. The perforated wall includes a plurality of openings or perforations 50 that extend through the perforated wall. Any number of openings or perforations may be employed to permit passage of the brine solution therethrough.

End caps 70 engage slidingly within the housing 14 ends and contact the perforated wall 30 forming a seal so that, along with seals 60, gas and liquid are prevented from exiting the cavity except through the hydrogen outlet port 80 or the purge valve 82.

In use, the water contained within the housing cavity contains sufficient electrolyte, such as salt ($Na^+Cl^-$) or another electrolyte, to conduct electricity, and may be referred to as a brine solution. When a voltage potential is placed across the anode (+) and cathode (−), the resulting current causes the brine to electrolyze and creates hydrogen ($H_2$) in the form of a gas at the cathode, and oxygen ($O_2$) in the form of a gas at the anode. The cathode walls 30 at each end of sleeve 22 create small chambers between the perforated walls 30 and the end caps 70 at each end of housing 14. Although the exact mechanism is not known, it is believed that these chambers holding the brine in communication with the main cavity significantly aid in the generation of usable hydrogen by the device.

Figure 3A:
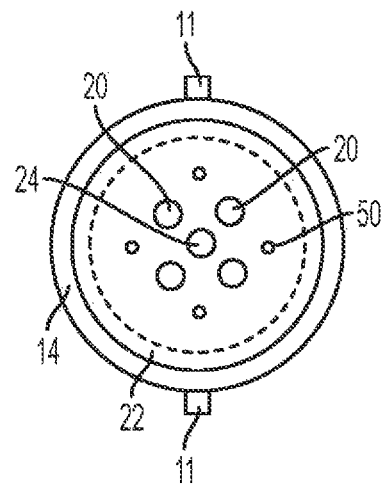
FIG. 3A is an elevational end view of the hydrogen gas generator of FIG. 1 with the endcap removed.
Figure 3B:
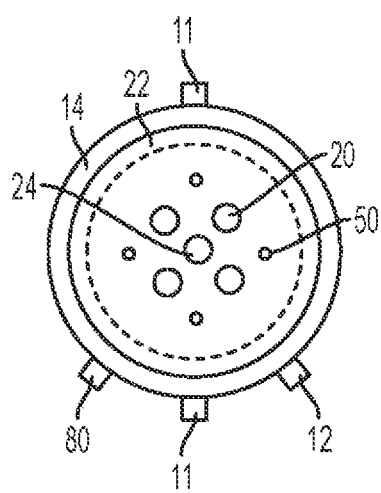
FIG. 3B is an elevational end view showing an alternate configuration of terminals and ports extending through the housing of the hydrogen gas generator according to the present invention.

FIG. 3A shows an end view of the hydrogen gas generator with the end cap 70 removed. The terminals 11 and each of the drain port 13, inlet port 12, hydrogen gas outlet port 80 and purge valve port 82 extend from the housing 14 in radially opposite direction as shown in FIG. 1. FIG. 3B shows an alternate arrangement where the housing openings are not aligned in straight rows on opposite sides of the housing. The arrangement may be additionally changed depending on the orientation of the hydrogen gas generator or other factors for implementation of the hydrogen gas generator.

Figure 4:
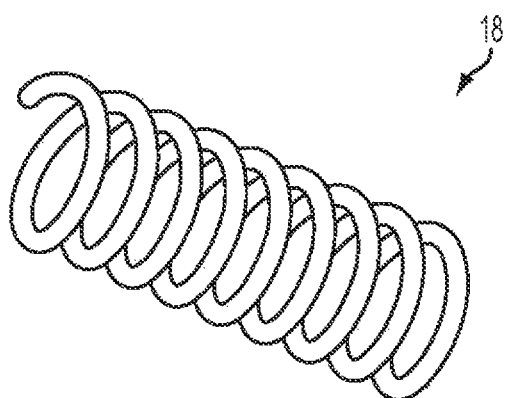
FIG. 4 is a perspective view of the anode of the hydrogen gas generator of FIG. 1.
Figure 5:
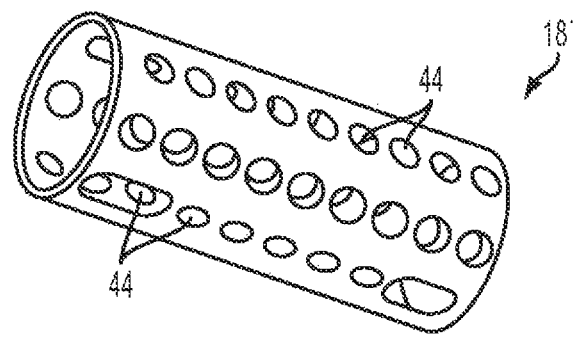
FIG. 5 is a perspective view of a second embodiment of the anode according to the present invention.
Figure 6:
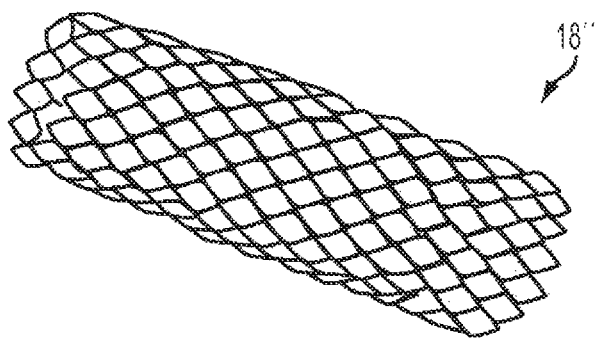
FIG. 6 is a perspective view of a third embodiment of the anode according to the present invention.

FIGS. 4-6 show various embodiments of the anode, FIG. 4 being the embodiment of the anode shown in FIG. 1 wherein the anode 18 is a hollow metal tube spirally wound in a cylindrical configuration and having the ends crimped closed. In another embodiment the anode 18' shown in FIG. 5 is a hollow metal cylinder which includes a plurality of anode openings 44 through the cylinder walls. Anode 18" shown in FIG. 6 is a cylindrical wire mesh. Anodes 18, 18' and 18" are supported within the cavity of housing 14 by contact with anode terminals 11.

Figure 7:
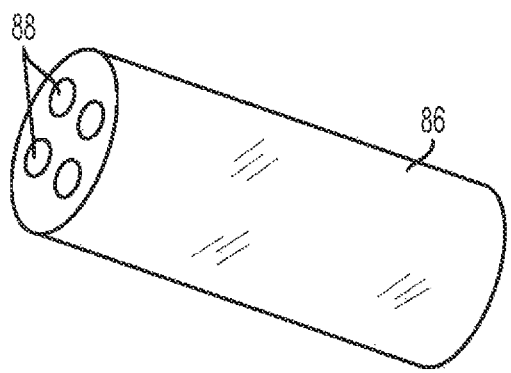
FIG. 7 is a perspective view of a fourth embodiment of the anode according to the present invention.
Figure 8:
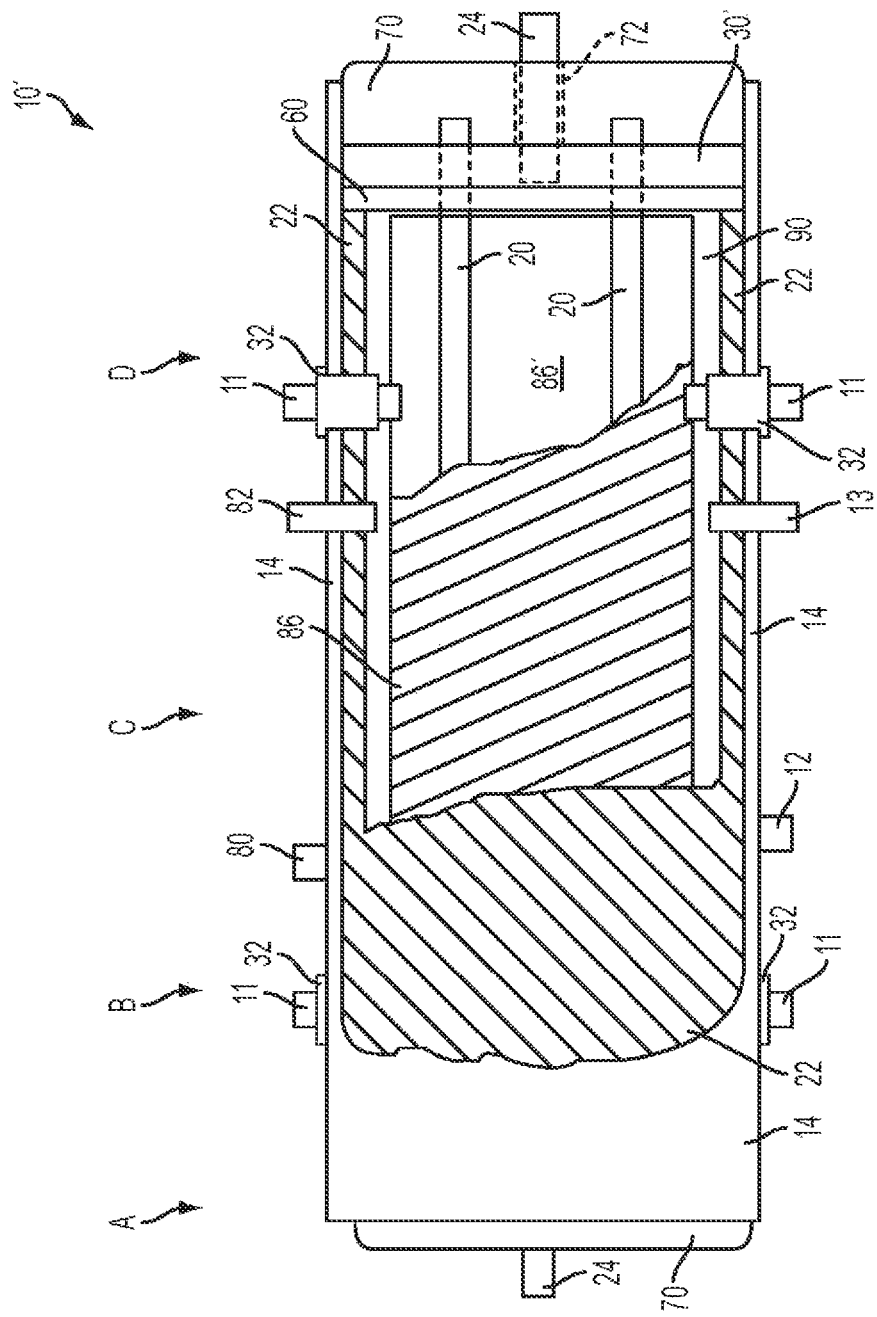
FIG. 8 is a cutaway view of a hydrogen gas generator including the anode shown in FIG. 7.
Figure 9:
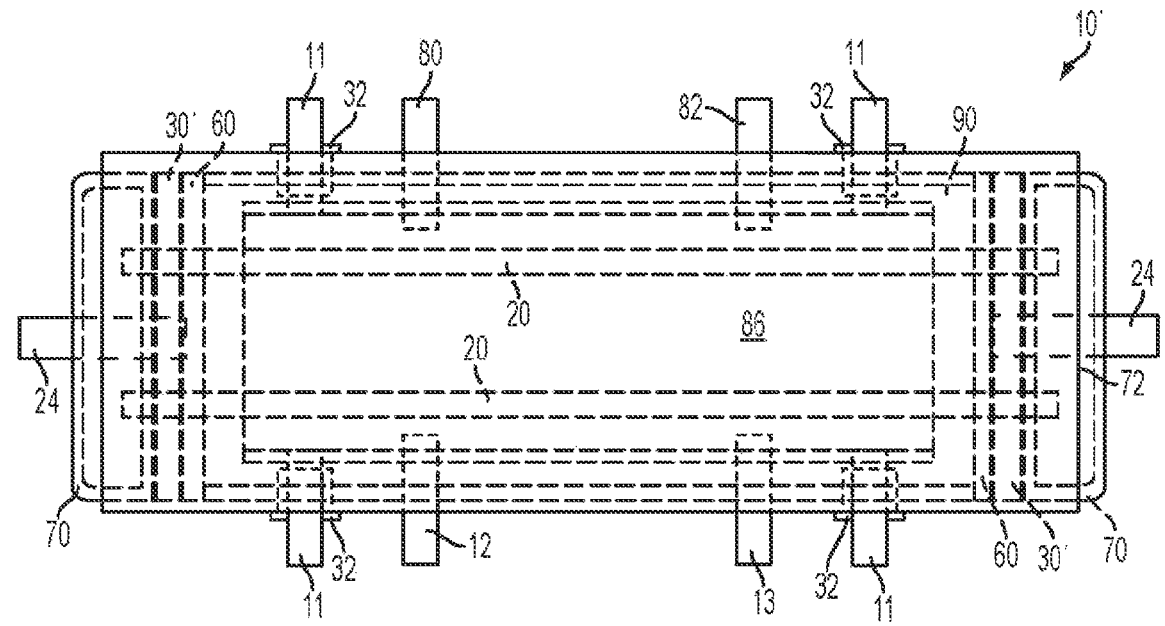
FIG. 9 is a side elevational view of a hydrogen gas generator shown in FIG. 8.

In another embodiment of the present invention shown in FIG. 7-9, the hydrogen generator 10' includes a cylindrical open cell metal foam anode 86 having bore holes or channels 88 extending the length of the anode 86. The cathode rods 20 are disposed through the holes 88 with at least one of the cathode rod ends extending beyond the corresponding end of the cylindrical anode 86. Alternatively, the cathode may be in the form of the open cell metal foam and the anode may be in the form of rods extending through the openings therein. The bore holes 88 have a diameter sufficiently sized so that such that the rods 20 do not contact the metal foam 86. The open cells of the metal foam allow brine or water 90 to flow freely through the cells from one side of the anode to the other. The cutaway view of FIG. 8 includes portion A showing the housing 14, portion B with the housing cut away to show the metal sleeve 22, portion C with the metal sleeve cut away to show the outside surface of the metal foam 86 and portion D with the outside surface of the metal foam cut away to show the inside surface of the metal foam 86' and the cathode rods 20. The metal foam is preferably an aluminum metal foam and may include a gold metal coating to prevent corrosion. Aluminum metal foam may be aluminum throughout the foam or may be a poly foam with aluminum coating applied over the foam. The anode 18, cathode rods 20 and sleeve 22 may additionally include a gold metal coating to prevent corrosion. An exemplary gold marine coating that may be applied to the anode, cathode, and other components of the hydrogen generator of the present invention is the coating sold under the brand name JET-HOT nPowered by nCoat LLC of Burlington, N.C. The coating may be a silica-based nano-ceramic organic hybrid, applied as either an aqueous- or solvent-based liquid by spraying, dipping, rolling or dip-spin method, and cured at an elevated temperature of 120-180° C. for 10 minutes or a time sufficient to bond and cure the coating to a desired thickness, e.g., 1-2 micrometers. An example is NanoMate coating available from Nanmat Technology of Kaohsiung, Taiwan.

FIGS. 8 and 9 includes a cylindrical ceramic coated aluminum housing 14 having housing openings 16 and a metal sleeve 22 slidingly disposed inside the housing 14. The housing 14 has opposing ends and a cavity between the ends and a perforated wall 30' is disposed near each of the housing ends. The perforated wall 30' is shown as a plate made from an open cell metal foam. Terminal insulators 32 are disposed between the anode terminal 11 and the metal sleeve 22. Ends of the anode terminals 11 protrude inwardly from the terminal insulators 32 so that mechanical and electrical connection can be made to the anode 18 inside the cavity and outwardly for connection to a power supply external to the cavity. The hydrogen gas generator 10' includes an end cap 70 with at least a portion of the endcap disposed slidingly inside the housing 14 end and a cathode terminal 24 disposed through an opening 72 in the endcap 70. The cathode terminal 24 electrically contacts the metal foam perforated wall 30' inside the housing and a voltage supply outside of the housing.

FIG. 9 is an assembled hydrogen gas generator 10' which includes the end caps 70 secured so that brine or water 90 within the cavity may flow freely within the cavity but not leak out. Drain port 13 allows the brine or water to flow out of the housing cavity when the port is in an open position and prevents flow when in the closed position. Inlet port 12 allows the brine or water to flow into the housing cavity when the port is in an open position and prevents flow when in the closed position.

Figure 10:
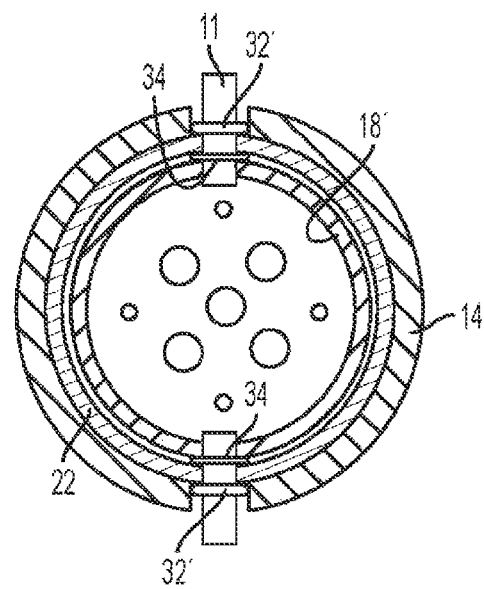
FIG. 10 is cross sectional end view of a hydrogen gas generator showing the connection of the anode terminals to the anode shown in FIG. 5.

FIG. 10 shows the anode 18' supported within the housing cavity by anode terminals 11 and anode washers 34. The washers 34 are attached to the anode terminals 11 and contact the outer wall of the anode 18', preventing the anode 18' from moving with respect to the housing 14. The anode terminal 11 is fastened to the housing 14 with an insulating o-ring 32'.

FIG. 11 shows the hydrogen gas generator 10 connected to a reservoir system for flushing the brine solution within the housing cavity. The housing may include a transparent window 46 for visual monitoring of the generator activity inside. The reservoir system includes a reservoir tank 58, feed line 62 for flowing solution 59 from the tank 58 to the generator through valve 67. The system also includes a return line 64, return valve 68 and a pump 66 for pumping the brine solution 59 through the generator and tank.

FIG. 12 shows components which are attached to the hydrogen gas generator for controlling and sensing the gas output from generator outlet 80 (FIG. 1). The components include valve 124 for controlling the hydrogen gas flowing from the outlet 80 to a caustic bubbler 38. The outlet of the bubbler 38 includes a drain valve 126, hydrogen outlet valve 122 and a Hobb switch 128. The Hobb switch 128 is a pressure sensing switch which includes a relay which engages when the pressure exceeds a given value. The Hobb switch may be used to close a safety circuit and turn off operation of the hydrogen gas generator if the hydrogen gas pressure exceeds a safe value.

FIG. 13 shows a block diagram of a controller for the hydrogen gas generator. The controller includes a central processing unit 100 and inputs from the gas generator or from the control components shown in FIG. 12 which include input 102 from the Hobb switch 128 and input 104 from a pressure gauge on the gas generator housing. The controller outputs include output 110 which sends an electrical output for controlling the drain port, output 112 for controlling power to the anode and cathode terminals, output 116 for controlling pump 66 and output 118 for controlling the flush valves 67, 68. The controller outputs may also include a safety shut-off 114 and hydrogen gas control 120 for controlling valve 124.

The anode is preferably aluminum although other metals may be used. The cathode rods are preferably stainless steel although other metal may be used. The anode and cathode structures may be interchanged and/or reversed in the hydrogen gas generator of the present invention.

In operation, brine or water 90 is injected into the cavity of the hydrogen gas generator 10 and a voltage differential is applied between the anode and cathodes, breaking down and electrolyzing the water inside of the cylinder. The chemical reaction produces hydrogen and oxygen gas and may produce other byproducts including hydroxide, chlorine and caustic soda. The hydrogen gas that is produced is allowed to exit the hydrogen gas outlet 80, while the purge valve 82 is provided for purging other gas or water from the cavity of the housing 14.

The hydrogen gas generator of the present invention has overcome the deficiency of the prior art by implementing a perforated wall which sufficiently separates the main housing cavity from the end chambers but allowing the brine to flow from the cavity to the end chamber and the end chamber to the cavity.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A hydrogen generating device comprising:
   a housing having an internal cavity and at least one housing opening;
   a cathode within the internal cavity;
   an anode within the internal cavity;
   a metal sleeve slidingly disposed within the internal cavity, the metal sleeve having at least one sleeve opening aligned with the at least one housing opening; and water in the housing extending continuously from a main portion of the internal cavity to an end portion of the internal cavity.

2. The hydrogen generating device of claim 1 wherein the cathode comprises a metal foam.

3. The hydrogen generating device of claim 1 wherein the anode comprises a metal foam.

4. The hydrogen generating device of claim 1 wherein the anode comprises a hollow metal tube spirally wound in a cylindrical configuration.

5. The hydrogen generating device of claim 1 wherein the anode is a hollow metal cylinder or a cylindrical wire mesh.

6. The hydrogen generating device of claim 1 wherein the sleeve comprises a metal sleeve slidingly disposed within the internal cavity.

7. The hydrogen generating device of claim 6 wherein the metal sleeve comprises a cylindrical metal sleeve.

8. The hydrogen generating device of claim 1 including at least one electrically conductive terminal extending outward from the internal cavity through the aligned openings of the at least one sleeve opening and the at least one housing opening, wherein the at least one terminal is in electrical contact with the anode.

9. A hydrogen generating device comprising:
   a housing having an internal cavity;
   a cathode and an anode within the internal cavity;
   a metal sleeve slidingly disposed within the internal cavity;
   a perforated wall within the internal cavity near the end portion of the internal cavity, the perforated wall being electrically connected to the anode or the cathode and separating the end portion of the internal cavity from the main portion of the internal cavity; and
   water in the housing extending continuously from a main portion of the internal cavity to an end portion of the internal cavity.

10. The hydrogen generating device of claim 9 wherein the sleeve has ends and an insulating spacer disposed between the sleeve ends and the perforated wall.

11. The hydrogen generating device of claim 9 wherein the anode or the cathode electrically connected to the perforated wall extends from the main portion of the internal cavity through the perforated wall into the end portion of the cavity and through the housing.

12. The hydrogen generating device of claim 9 wherein the perforated wall is a metal plate having openings therein.

13. The hydrogen generating device of claim 9 wherein the perforated wall is an open cell metal foam.

14. The hydrogen generating device of claim 9 wherein the housing has two end portions and the perforated wall within the internal cavity near and separating each end portion of the internal cavity from the main portion of the internal cavity, the anode or the cathode extending through one end portion of the housing through one perforated wall into the main portion of the internal cavity, through the other perforated wall into the other end portion of the internal cavity and through the other end of the housing, the water in the housing extending continuously from the main portion of the internal cavity through each of the perforated walls and into the end portions of the internal cavity.

15. A hydrogen generating device comprising:
   a housing having an internal cavity;
   an open cell metal foam disposed within the internal cavity for providing an electrical current therein;
   a sleeve slidingly disposed within the internal cavity; and
   water residing in the housing extending continuously through the open cell metal foam,
   wherein the open cell foam has channels therein and is either an anode or a cathode,
   wherein if the open cell foam is the anode the cathode extends through the channels in the foam anode, or if the open cell foam is the cathode the anode extends through the channels in the foam cathode, the channels have a length and include channel walls with a space between the cathode or the anode and channel walls extending the length of the channel walls, the space substantially filled with the water.

16. The hydrogen generating device of claim 15 wherein the open cell foam is the anode having channels therein, whereby the cathode extends through the channels in the open cell foam anode.

17. The hydrogen generating device of claim 15 wherein the housing has at least one housing opening aligned with at least one sleeve opening of the sleeve, further including at least one electrically conductive terminal extending outward from the internal cavity through the aligned openings of at least one sleeve opening and the at least one housing opening.

18. The hydrogen generating device of claim 15 wherein the open cell foam is the cathode having channels therein, whereby the anode extends through the channels in the open cell foam cathode.

19. The hydrogen generating device of claim 15 wherein the sleeve comprises a metal sleeve slidingly disposed within the internal cavity.

20. A method for using a hydrogen generating device comprising:
   providing a housing having an internal cavity with an anode and cathode therein, the housing having at least one housing opening, along with a metal sleeve slidingly disposed within the internal cavity of the housing, the metal sleeve having at least one sleeve opening aligned with the at least one housing opening, the housing having water residing continuously therein from a main portion of the internal cavity to an end portion of the internal cavity; and
   applying a voltage differential between the anode and cathode sufficient to allow production of hydrogen gas.

* * * * *